US 8,601,199 B2

(12) United States Patent
Tolliver

(10) Patent No.: US 8,601,199 B2
(45) Date of Patent: Dec. 3, 2013

(54) VIRTUAL ETHERNET SWITCH VIA PCI-E CARD

(75) Inventor: Eric W. Tolliver, Moorpark, CA (US)

(73) Assignee: Alcatel Lucent, Paris (FR)

( * ) Notice: Subject to any disclaimer, the term of this patent is extended or adjusted under 35 U.S.C. 154(b) by 338 days.

(21) Appl. No.: 12/806,898

(22) Filed: Aug. 24, 2010

(65) Prior Publication Data

US 2012/0054405 A1    Mar. 1, 2012

(51) Int. Cl.
    *G06F 13/00*    (2006.01)
(52) U.S. Cl.
    USPC ............ 710/316; 710/300; 710/301; 710/302
(58) Field of Classification Search
    USPC .......................................... 710/300–302, 316
    See application file for complete search history.

(56) References Cited

U.S. PATENT DOCUMENTS

| 7,701,949 | B1* | 4/2010 | Rose et al. | 370/395.42 |
|---|---|---|---|---|
| 7,966,402 | B2* | 6/2011 | Emerson et al. | 709/226 |
| 8,098,574 | B2* | 1/2012 | Southworth et al. | 370/217 |
| 8,161,332 | B2* | 4/2012 | Skirmont et al. | 714/704 |
| 2004/0233652 | A1* | 11/2004 | Sandy et al. | 361/788 |
| 2011/0097082 | A1* | 4/2011 | Bandyopadhyay | 398/45 |
| 2011/0135312 | A1* | 6/2011 | El-Ahmadi et al. | 398/135 |
| 2011/0243031 | A1* | 10/2011 | Aybay | 370/254 |
| 2011/0302346 | A1* | 12/2011 | Vahdat et al. | 710/301 |

OTHER PUBLICATIONS

Supplement to InfiniBand Architecture Specification vol. 2 Release 1.2.1—"Annex A6: 120 Gb/s 12x Small Form-factor Pluggable (CXP)"; 94 pages, Dated Sep. 2009.*
"JetCard 2205—5-ports 10/100Mbps Fast Ethernet Switch Universal PCI Card"; 3 pages, Dated Nov. 16, 2008.*
Marvell—"Link Street 88E6060—Low Power 6-port 10/100 Ethernet Switch"; 164 pages, Dated Jan. 3, 2008.*
"ServerSwitch: A programmable and High Performance Platform for Data Center Networks"; 14 Pages, Dated 2011.*
Cisco Expo 2010—"2010: Year of the 40/100G Ethernet standard"; 13 pages, Dated 2010.*
Brocade—"40 Gigabit and 100 Gigabit Ethernet Are Here!"; 8 pages, Dated 2010.*
Liantec—"Tiny-Bus PCIe Gbit Ethernet Switch Module with Four Gbit Ethernet Switch Ports"; 4 pages, Dated Jul. 24, 2009.*
"AEI-e410C—Product Brief; PCI Express Embedded PoE 4 + 1 Physical Layer Switch"; 3 pages, Dated Sep. 2011.*
Broadcom—"BCM5388 Product Brief—8GE Port Switch with Integrated GE Copper PHY"; 2 pages, Dated Mar. 25, 2004.*
Broadcom—"BCM57712 Product Brief—10 Gbps Dual-Port TOE, iSCSI, FCoE, and RDMA PCI-SIG SR-IOV x8 PCI Express Gen-2 Controller"; 2 pages, Dated Jan. 5, 2010.*
Hitech Global—"Xilinx Virtex-7 High-End Networking Card with Dual CXP Ports"; 3 pages, Dated Jan. 13, 2013.*

(Continued)

*Primary Examiner* — Brian Misiura
(74) *Attorney, Agent, or Firm* — Garlick & Markison

(57) ABSTRACT

The preferred methodology for manufacture of a PCIe card of the preferred embodiment involves placing a switch such as a switching ASIC on a PCIe card and operatively connecting the switching ASIC to the PCIe card. The preferred methodology also includes operatively connecting a power management module to the PCIe card and including CXP connectors on the PCIe card. The PCIe card of the preferred embodiment includes a power management module (i.e. a power converter) and a switching ASIC. The PCIe card of the preferred embodiment further includes three CXP connectors. In one embodiment, the supporting CPU for switch control and management is placed on the PCIe card.

6 Claims, 6 Drawing Sheets

(56) References Cited

OTHER PUBLICATIONS

DSS networks—"Press Release for GigPCI-Express Switch—Model 6468"; 1 Page, Dated Jan. 18, 2005.*

DSS Networks—"GigPCI-Express Switch—Board and Driver Users Manual"; 54 Pages, Dated Sep. 2007.*

DSS networks—"GIGPCI-Express Switch—Model 6468"; 2 pages, Dated Feb. 2005.*

* cited by examiner

VIRTUAL ETHERNET SWITCH VIA PCI-E CARD

CROSS-REFERENCE TO RELATED APPLICATIONS

This United States non-provisional patent application does not claim priority to any United States provisional patent application or any foreign patent application.

FIELD OF THE DISCLOSURE

The disclosures made herein relate generally to the telecommunications industry. The invention discussed herein is in the general classification of a method and device involving placement of a switch (e.g. a switching application-specific integrated circuit (ASIC)) on a Peripheral Component Interconnect Express (PCIe) card wherein the PCIe card is placed within a traditional server to provide switching functionality.

BACKGROUND

This section introduces aspects that may be helpful in facilitating a better understanding of the invention. Accordingly, the statements of this section are to be read in this light and are not to be understood as admissions about what is in the prior art or what is not in the prior art.

Several technical terms and/or phrases will be used throughout this application and merit a brief explanation.

A traditional server or server is any type of computer or device that often links other computers or electronic devices together.

A blade server is a server of reduced size and with reduced power consumption. Many components of a traditional server are removed to create the space saving and reduced power consumption of a blade server. A blade enclosure (chassis) holds multiple blade servers and up to one hundred twenty-eight (128) servers can be held on a single server rack. The blade enclosure allows computing services to be shared among multiple blade servers. Blade servers that utilize a switch located within the chassis (e.g. built in switch or a switch on a separate board) to provide network connectivity to the blades are expensive.

A switch is a computer device that connects network segments. A switch usually can process and route data.

PCIe is a standard for computer expansion cards. It is used in server applications to link motherboard-mounted peripherals. The PCIe utilizes point-to-point serial links instead of a shared parallel bus architecture.

ASIC is an integrated circuit (IC) that has a specific use instead of multi-purpose uses. ASICs may include processors and memory blocks.

CXP is a connector system with twelve (12) ten 10 Gigabits per second (Gbps) links suitable for one hundred (100) Gbit Ethernet or three (3) forty (40) Gbit Ethernets or twelve (12) ten (10) Gbit Ethernets.

Ethernet defines wiring and signaling standards for the physical layer of the Open Systems Interconnection (OSI) model and addressing format and Media Access Control (MAC) at the data link layer.

A central processing unit (CPU) is sometimes simply referred to as a processor. It is located in a computer system and is responsible for carrying out the instructions contained in a computer program.

A traditional server rack is typically a standardized enclosure for mounting traditional servers and permits storage of multiple servers in a single rack. A U-slot is a single rack unit which is traditionally 1.75 inches in height and accommodates nineteen (19) inch wide servers. In a typical 42U rack, almost five percent (5%) of the rack space is used for network switches (i.e. $2/42$ of rack space is used due to the existence of a top of rack switch and a redundant switch). High speed switches for use as top of rack switches and redundant switches are relatively expensive equipment.

A data center network houses multiple server racks. Data centers have three main problems: space, power and cooling. Most existing data center networks use traditional servers because of the cost effectiveness when compared to the use of blade servers.

Hence, there is a need for a device and method that efficiently, reliably and affordably permits a switch to be placed on a PCIe card for use in traditional servers to conserve space in a data center network.

SUMMARY OF THE DISCLOSURE

The preferred methodology for manufacture of a PCIe card of the preferred embodiment for use with a server of the preferred embodiment involves inserting a switch such as a switching ASIC on a PCIe card and operatively connecting the switch to the PCIe card. The preferred methodology also includes operatively connecting a power management module to the PCIe card and operatively connecting the power management module to the switch and inserting CXP connectors on the PCIe card and operatively connecting the CXP connectors to the switch.

The methodology for manufacture of a server of the preferred embodiment may further involve inserting the PCIe card with the switching ASIC within a PCIe server slot in the server and operatively connecting the PCIe card to the traditional server to provide switching functionality.

The PCIe card of the preferred embodiment includes a power management module (i.e. a power converter) and a switching ASIC. The power management module is necessary to allow power conversion because the switching ASIC may require a different power level than a x86 server (i.e. traditional server). The PCIe card of the preferred embodiment further includes three CXP connectors. These CXP connectors are utilized to operatively connect the PCIe card and the switching ASIC thereon to cable assemblies that lead to the various servers in a server rack.

In one embodiment, the supporting CPU for switch control and management is inserted on the PCIe card.

In another embodiment, the supporting CPU of the server containing the PCIe card is utilized for performing switch control and management. In this embodiment, software can run on the server containing the PCIe card.

In certain embodiments, the software can even run on a virtual machine within the server containing the PCIe card.

In other embodiments, the CPU could be inserted inside of future switching ASICs.

The server of the preferred embodiment includes a PCIe slot for receiving a PCIe card having a switching ASIC thereon and a memory containing a set of instructions and a processor for processing the set of instructions. The set of instructions include instructions for controlling and managing the ASIC of the PCIe card.

Under some applications, embodiments may provide a method that is relatively inexpensive to implement that permits a switch to be placed on a PCIe card for use in traditional servers.

Under some applications, embodiments may provide a device and method that are not operationally complex that permit a switch to be placed on a PCIe card for use in traditional servers.

Under some applications, embodiments may provide a device and method that efficiently permit a switch to be placed on a PCIe card for use in traditional servers.

Under some applications, embodiments may provide a reliable device and method that permit a switch to be placed on a PCIe card for use in traditional servers.

Under some applications, embodiments may provide a device that is relatively inexpensive to manufacture and deploy that permits a switch to be placed on a PCIe card for use with traditional servers.

Under some applications, embodiments may provide a method and a device that permit a switch to be placed on a PCIe card for use with traditional servers that provides more efficient use of power in a data center network.

Under some applications, embodiments may provide a method and a device that permit a switch to be placed on a PCIe card for use with traditional servers that provides better cooling of the server.

Under some applications, embodiments may provide a method and device that permit a switch to be placed on a PCIe card for use with traditional servers that conserves space in a data center network.

BRIEF DESCRIPTION OF THE DRAWINGS

Some embodiments of apparatus and/or methods of the present invention are now described, by way of example only, and with reference to the accompanying drawings, in which.

DETAILED DESCRIPTION OF THE DRAWINGS

Figure 1:
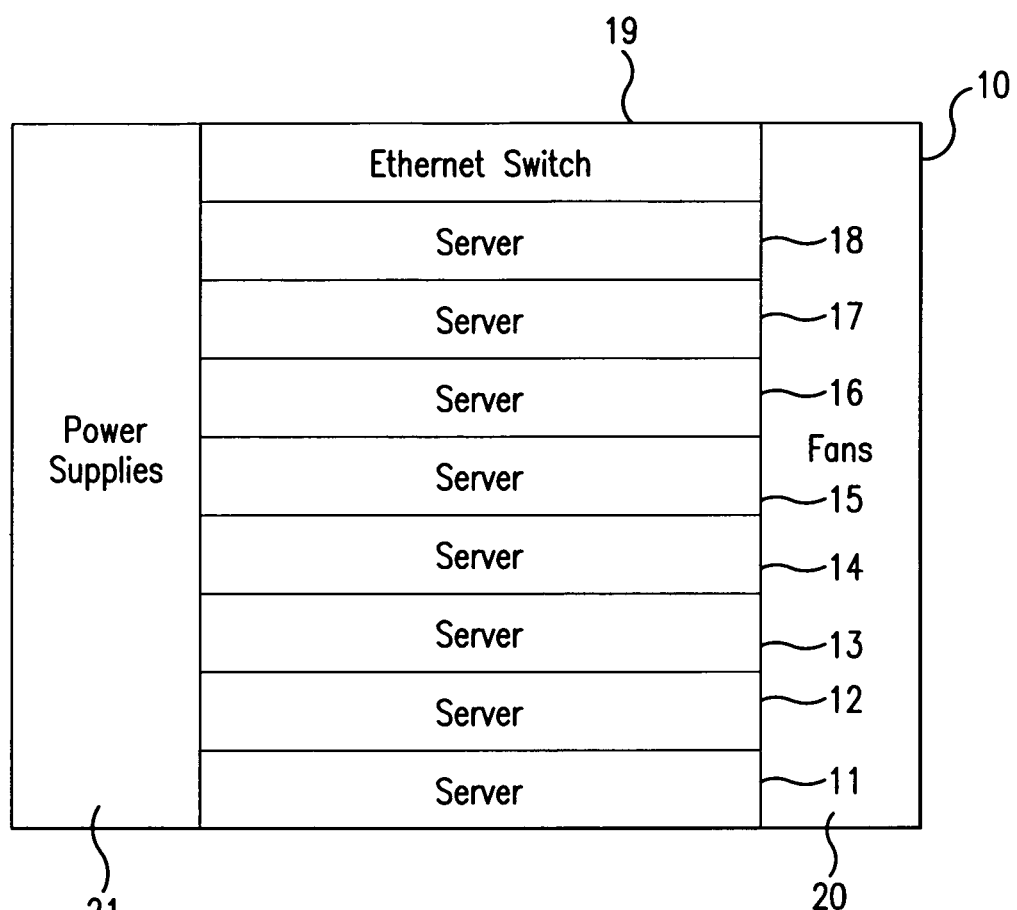
FIG. 1 depicts a typical blade server enclosure/chassis.

FIG. 1 depicts a typical blade server enclosure. A blade server enclosure 10 holds multiple blade servers 11-18. The blade enclosure 10 allows computing services to be shared among the multiple blade servers 11-18. A switch 19 located within the blade enclosure 10 provides network connectivity to the multiple blade servers 11-18 in the blade enclosure 10. The switch 19 processes and routes data to the appropriate blade servers 11-18. Fans 20 assist with the necessary cooling for the blade servers 11-18 and the power supplies 21 provide the necessary power to the switch 19 and blade servers 11-18.

Figure 2:
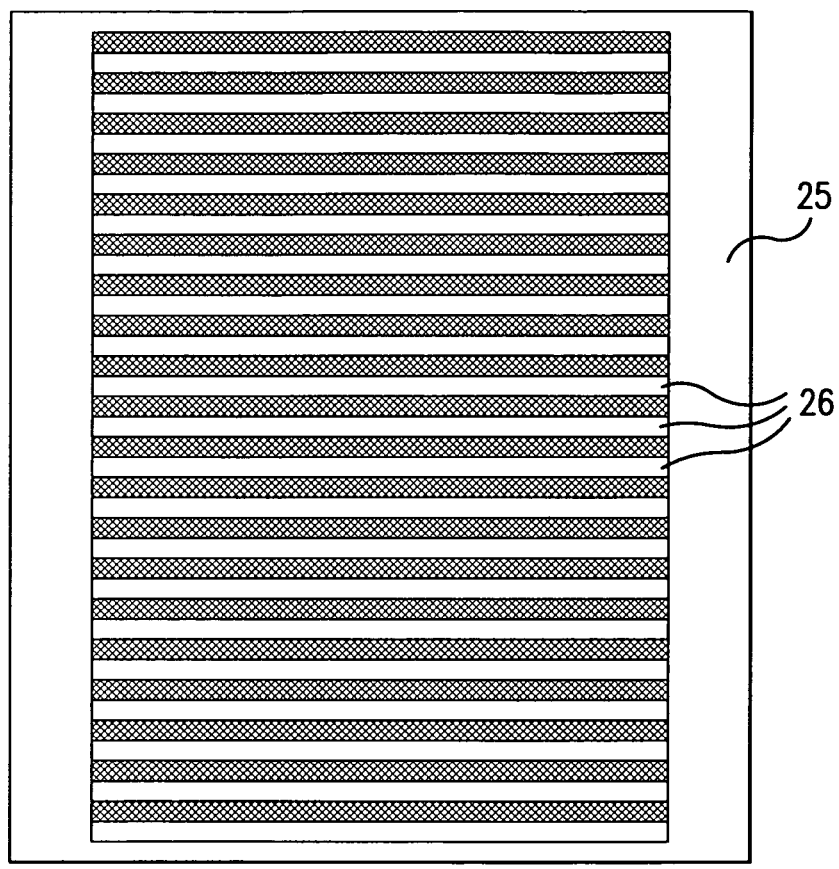
FIG. 2 depicts a traditional server rack.

FIG. 2 depicts a traditional server rack. A traditional server rack 25 is a standardized enclosure for mounting traditional servers. Multiple U-slots 26 allow multiple servers to be placed in the traditional server rack 25. In this embodiment, all U-slots 26 are 1.75 inches in height and accommodate nineteen (19) inch wide traditional servers. Typically, a top of rack switch and a redundant switch occupy two of the U-slots 26 in the traditional server rack 25.

Figure 3:
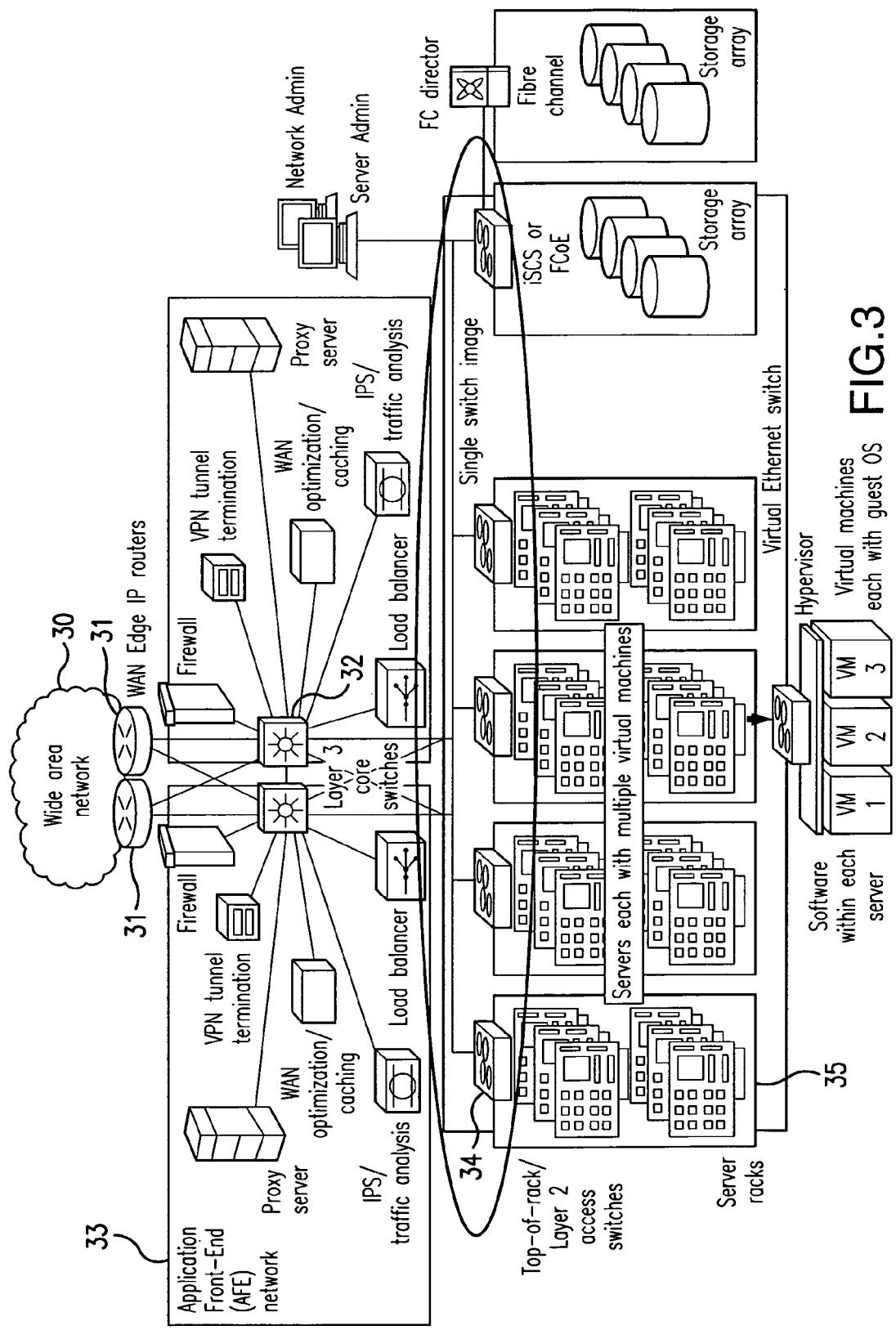
FIG. 3 depicts a typical data center network with multiple traditional server racks containing traditional servers.

FIG. 3 depicts a typical data center network with multiple traditional server racks containing traditional servers. Many components are connected in this typical data center network. A wide area network 30 connects to Wide Area Network (WAN) Edge Internet Protocol (IP) routers 31. The WAN Edge IP routers 31 connect to Layer 3 core switches 32. The Layer 3 core switches 32 are part of the Application Front-End (AFE) network 33. These Layer 3 core switches 32 connect to the top of rack/layer 2 access switches 34 which are circled in FIG. 3. These top of rack/layer 2 access switches 34 are the switches that are being replaced with switches located on PCIe cards placed in servers in the present invention. The top of rack/layer 2 access switches 34 traditionally occupy U-slots on traditional server racks 35 and consume space that otherwise could be utilized for additional servers.

Figure 4:
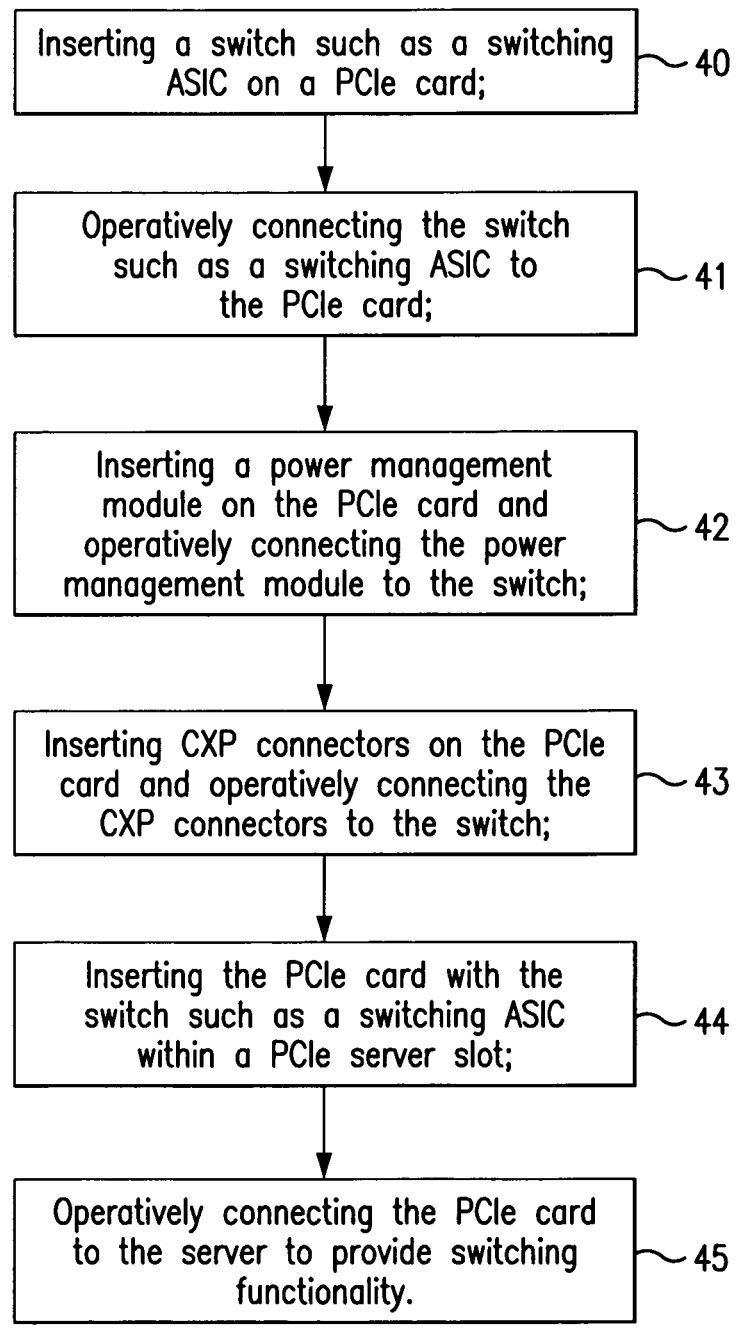
FIG. 4 depicts the method of the preferred embodiment for manufacturing a PCIe card that includes a switch and manufacturing a server that accommodates a PCIe card that includes a switch.

FIG. 4 depicts the method of the preferred embodiment for manufacturing a PCIe card that includes a switch and manufacturing a server that accommodates a PCIe card that includes a switch.

The methodology for manufacture of a PCIe card of the preferred embodiment involves inserting a switch such as a switching ASIC (e.g. Broadcom's Trident ASIC or Marvell's Lion ASIC) on a PCIe card 40 and operatively connecting the switch such as a switching ASIC to the PCIe card 41. The methodology also includes inserting a power management module (i.e. a power converter) on the PCIe card and operatively connecting the power management module to the switch 42. The methodology further involves inserting CXP connectors on the PCIe card and operatively connecting the CXP connectors to the switch 43.

The methodology for manufacture of a server of the preferred embodiment may further involve inserting the PCIe card with the switch such as a switching ASIC within a PCIe server slot 44 and operatively connecting the PCIe card to the server to provide switching functionality 45. Manufacturing a server that accommodates a PCIe card with a switching ASIC placed thereon obviates the need to utilize U-slots for a top of the rack switch and a redundant switch when using a traditional server rack.

Figure 5:
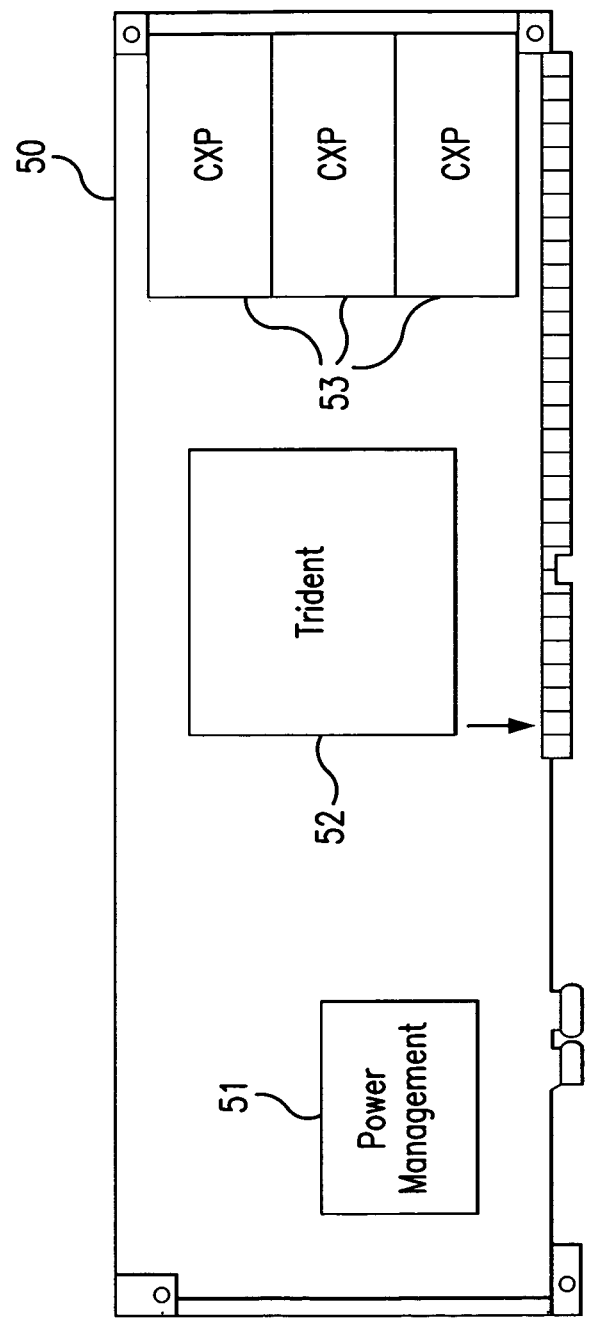
FIG. 5 depicts the PCIe card of the preferred embodiment.

FIG. 5 depicts the PCIe card of the preferred embodiment. In the preferred embodiment, several servers in the rack would hold these PCIe cards to provide the preferred switching redundancy.

The PCIe card 50 includes a power management module 51 and a switching ASIC (e.g. Broadcom's Trident ASIC) 52. The power management module 51 is necessary to allow power conversion because the switching ASIC (e.g. Broadcom's Trident ASIC) 52 uses different power levels than a x86 server (i.e. traditional server). The power management module 51 allows conversion from a first power level for a server to a second power level for the switching ASIC or other switch. In this preferred embodiment, Broadcom's Trident ASIC 52 is utilized for the switching ASIC. The Broadcom's Trident ASIC 52 functions as a high end multi-port switch on the PCIe card 50 to perform the network switching normally performed by a top rack switch. The PCIe card 50 further includes three CXP connectors 53. These CXP connectors 53 are utilized to operatively connect the PCIe card 50 and the switching ASIC/Trident 52 thereon to cable assemblies that lead to the various servers in a server rack.

Each of the CXP connectors 53 of the preferred embodiment provides twelve (12) ports of 10 Gbs each. The three (3) CXP connectors 53 provide a total of thirty-six (36) 10 Gbs ports for one (1) PCIe card/slot in a server. Broadcom's Trident ASIC 52 provides forty-eight (48) 10 Gbs ports of advanced layer 2-Ethernet and layer 3-IP switching at full wire rate.

When the PCIe card 50 is operatively connected to and inserted into a server via the PCIe slot, several options exist for the supporting CPU for switch control and management (i.e control of the ASIC/Broadcom's Trident ASIC 52). In one embodiment, the supporting CPU could also be placed on the PCIe card 50.

In a second embodiment, the supporting CPU of the server containing the PCIe card 50 could be utilized for performing switch control and management. In this embodiment, software can run on the server containing the PCIe card 50.

In certain embodiments, the software can even run on a virtual machine within the server containing the PCIe card 50. The use of switch control and management software on a virtual machine on the server containing the PCIe card 50 is referred to as virtualizing the software and is preferable because it does not interfere with other operations of the server as the software runs on a processor separate and distinct from at least one other processor that performs other server functionality.

In some embodiments, the CPU could even be placed inside of switching ASICs.

In certain embodiments, a daughter card (i.e. a second PCIe card) could also be utilized to provide additional CXP connectors within a second PCIe slot in the server to increase the port count to match the capabilities of the switching ASIC (e.g. Trident can scale to 64 10 Gbs ports). Each CXP connector can handle twelve (12) 10 Gbs ports or three (3) 40 Gbs ports. In certain embodiments, the second PCIe card would also have a switching ASIC and in other embodiments the second PCIe card's CXP connectors would utilize the switching ASIC of the first PCIe card and would not need a separate ASIC.

The use of an octopus type cable that permits splitting the cable outside of the server would then be utilized to operatively connect each server to the CXP connectors. In this manner, a single cable assembly operatively connected to a single CXP connector can be split into twelve separate cables outside of the server and run to the appropriate servers based on port assignment.

In lab tests, the preferred embodiment of the PCIe card depicted herein uses substantially fewer watts than the PCIe standard allowance of one hundred and fifty (150) watts.

The Molex CXP is one example of a suitable CXP connector. Some examples of suitable switching ASICs include the forty-eight (48) port 10 Gbs switching Broadcom Trident ASIC and Marvel Lion ASIC. In general, a high end switch with twenty-four or more ports is preferable for use on a PCIe card to be utilized as a network switch. Texas Instruments makes several suitable power management modules/converters.

Figure 6:
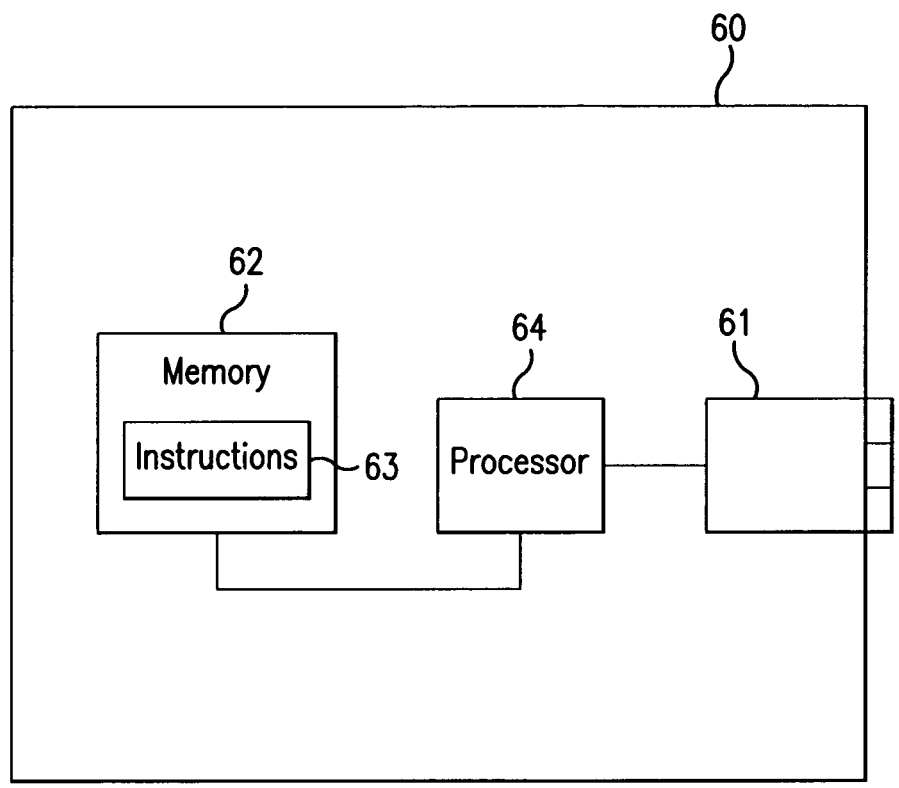
FIG. 6 depicts the server of the preferred embodiment.

FIG. 6 depicts the server of the preferred embodiment. The server 60 includes a PCIe slot 61 for receiving a PCIe card having a switch and at least one CXP connector thereon and a memory 62 containing a set of instructions 63 and a processor 64 for processing the set of instructions. The set of instructions 63 include instructions for controlling and managing the ASIC of the PCIe card.

The set of instructions for controlling and managing the ASIC of the PCIe card may include instructions for determining or selecting port assignments for other servers connected to the server via the at least one CXP connector, routing data from the server to another server via an assigned port and receiving data from another server via an assigned port.

The set of instructions 63 may further include instructions for controlling and managing an ASIC on a second PCIe card. The set of instructions for controlling and managing the ASIC of the second PCIe card may include instructions for determining or selecting port assignments for other servers connected to the server, routing data from the server to another server via an assigned port and receiving data from another server via an assigned port.

It is contemplated that some of the methodology described herein may be implemented as software, including a computer-readable medium having program instructions executing on a computer, hardware, firmware, or a combination thereof. Some of the methodology described herein also may be implemented in various combinations on hardware and/or software.

A person of skill in the art would readily recognize that some of the steps of the various above-described methodology may be performed by programmed computers and the order of the steps is not necessarily critical. Herein, some embodiments are intended to cover program storage devices, e.g., digital data storage media, which are machine or computer readable and encode machine-executable or computer executable programs or instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

It will be recognized by those skilled in the art that changes or modifications may be made to the above-described embodiments without departing from the broad inventive concepts of the invention. It should therefore be understood that this invention is not limited to the particular embodiments described herein, but is of the invention as set forth in the claims.

What is claimed is:

1. A device capable of performing switching functionality comprising:
   a Peripheral Component Interconnect Express (PCIe) card having a switch and at least one CXP connector; and
   a processor for processing instructions for controlling and managing the switch of the PCIe card, including selecting port assignments for a plurality of servers operatively connected to the device; and
   a virtual machine within the device that utilizes the processor to run the instructions for controlling and managing the switch while at least one separate processor is utilized by the device to perform other device functionality.

2. The device of claim 1 wherein the instructions for controlling and managing the switch further include instructions for routing data from the device to at least one of the plurality of servers via an assigned port and receiving data from the at least one of the plurality of servers via the assigned port.

3. The device of claim 1 wherein the switch is an application-specific integrated circuit (ASIC).

4. A device capable of performing switching functionality comprising:
   a first Peripheral Component Interconnect Express (PCIe) card having a switch and at least one CXP connector;
   a processor for processing instructions for controlling and managing the switch of the first PCIe card, including selecting port assignments for a plurality of servers operatively connected to the device; and
   a PCIe slot for receiving a second PCIe card having a switch inserted onto the second PCIe card and at least one CXP connector on the second PCIe card wherein the instructions further include instructions for controlling and managing the switch of the second PCIe card.

5. The device of claim 4 further comprising:
a cable assembly operatively connected to the at least one CXP connector of the PCIe card for operatively connecting the plurality of servers to the device.

6. The device of claim 4, wherein the first PCIe card, comprises:
a power management module operatively connected to the switching circuit operable to control power conversion from a first power level for the at least one server to a second power level for the switching circuit.

* * * * *